United States Patent [19]

O'Donnell et al.

[11] Patent Number: 4,765,758
[45] Date of Patent: Aug. 23, 1988

[54] LAMINATED BEARING

[75] Inventors: Brian R. O'Donnell, Burlington; Mark F. Peretti, Braintree, both of Mass.

[73] Assignee: Barry Wright Corporation, Newton Lower Falls, Mass.

[21] Appl. No.: 689,118

[22] Filed: Jan. 7, 1985

[51] Int. Cl.⁴ ............... F16C 27/06; B60G 11/22; F16D 1/00
[52] U.S. Cl. .................... 384/221; 384/222; 267/141.1; 267/141.2; 267/279; 403/228
[58] Field of Search .......... 267/57.1 R, 57.1 A, 267/63 R, 63 A, 140.5, 141.1, 141.2, 141.3, 151, 152, 153; 403/220–228; 384/125, 202–204, 215, 220–222, 297; 416/134 R, 134 A, 141

[56] References Cited

U.S. PATENT DOCUMENTS

| | | | |
|---|---|---|---|
| 1,868,818 | 7/1932 | Eksergian | 403/132 X |
| 2,270,902 | 1/1942 | Rubissow | 403/228 X |
| 3,071,422 | 1/1963 | Hinks | 267/57.1 R X |
| 4,286,827 | 9/1981 | Peterson et al. | 267/141.1 X |
| 4,349,184 | 9/1982 | Peterson et al. | 384/125 X |

FOREIGN PATENT DOCUMENTS

| | | | |
|---|---|---|---|
| 869345 | 5/1961 | United Kingdom | 267/57.1 R |
| 890991 | 3/1962 | United Kingdom | 267/57.1 R |

Primary Examiner—David Werner
Attorney, Agent, or Firm—Milton E. Gilbert; James W. Mitchell

[57] ABSTRACT

A sound isolating bearing has concentric inner and outer housings made of steel with a concentric shim between the inner and outer housings sandwiched by layers of a resilient elastomer. The longitudinal cross section of the shim is convex on both inside and outside surfaces with the same radius of curvature to allow cocking of the inner housing relative to the outer housing about a first point on the bearing axis midway between the ends and about a second pivot point outside the bearing in a plane midway between the bearing ends perpendicular to the bearing axis.

18 Claims, 2 Drawing Sheets

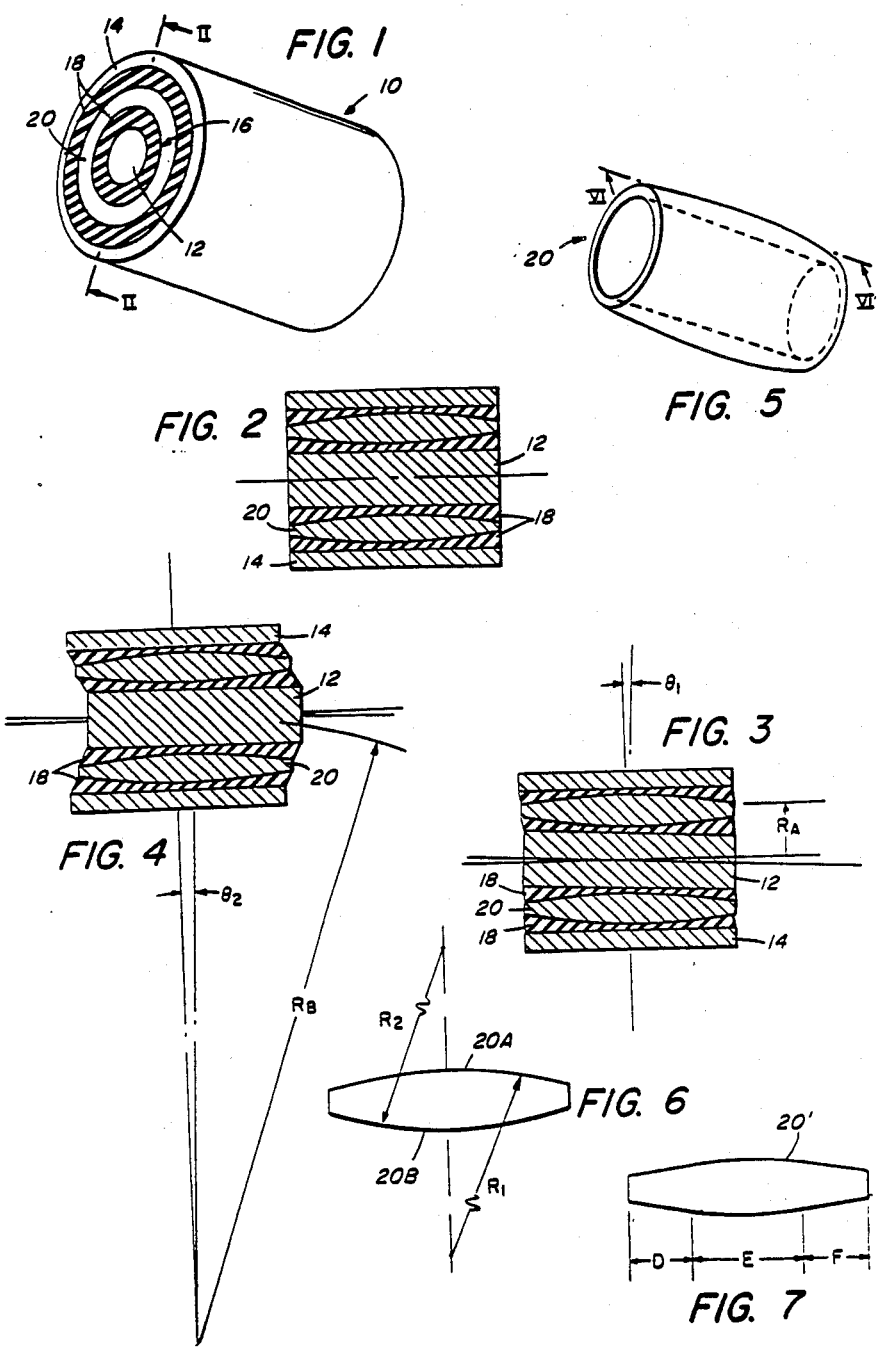

LAMINATED BEARING

This invention relates to laminated bearings and more particularly to a laminated cylindrical sound isolation bearing capable of accommodating cocking about points internal as well as external to the bearing.

Complex couplings utilizing laminated elastomeric technology typically have comprised a plurality of laminations differing in configuration and orientation and acting either independently or in combination with one another to handle each loading and motion. Such couplings are quite costly to manufacture and often run afoul of size restrictions.

A preliminary novelty search uncovered U.S. Pat. Nos. 1,092,613, 1,868,818, 1,880,504, 3,071,422, 3,243,239, 3,504,902, 3,834,181, 3,862,812, 4.063,787, and 4,142,833.

Laminated bearings find use in coupling systems, for example, in rotor blade retention systems suitable for use in aircraft such as helicopters. In conventional articulated rotor system it is customary to provide a blade retention system for each axis of movement desired. For instance, in a fully articulated rotor system, three separate connections including precision roller bearings are provided for permitting pivotal movement of the blade about a lead-lag and flapping axis and for rotation about a pitch axis. Simultaneously, each of these connections must restrain movement of the blade against centrifugal forces imposed thereon during rotation of the rotation system. Such combinations of loads and motions result in early failure of these connections.

In an effort to replace such complex structures, and alleviate many of the inherent disadvantages, attention has been directed to the use of elastomeric bearings comprising alternating and bonded layers of an elastomeric material and a substantially non-extensible material. The layers of the latter material are known as shims. Laminated bearings have the ability to carry high compressive loads normal to the layers (without excessive bulging of the elastomer), to accommodate deflection in torsion and/or shear along the layers and to accommodate motion.

In the design of coupling systems in general which employ laminated bearings, numerous factors must be considered. Consideration must be given to fatigue life, weight and size limitations, structural interconnections, the desired spring rate of the bearing in various modes, and the motions and loads to be realized in the particular application. In complex couplings which must carry loading and accommodate motions about several different axes, as discussed above, the analysis of these considerations can be quite difficult. A computer is used. Finite element analysis determines a matrix of stresses and strains for the application and aids in the selection of the design control parameters of types and values for the application. Design control parameters include the geometry of the bearing (e.g. cylindrical, spherical, frusto-conical, and combinations thereof), the relative orientation of the layers, the size of the laminate and the characteristics of the elastomeric material.

It is an object of the present invention to provide a laminated bearing of simple design for a coupling system.

Another object of the present invention is to provide a laminated bearing capable of carrying loading along a first axis and accommodating motion along a second axis and/or about a third axis.

A further object of the present invention is to provide a bearing having a generally cylindrical elastomeric laminate capable of accommodating cocking about points internal and external to the bearing while carrying a load in a radial direction.

According to the invention, bearing means comprises coaxial inner and outer members of relatively hard material, such as cadmium plated steel. Shim means between the inner and outer members of oval or ogival cross section is sandwiched between elastomer sleeves, typically made of neoprene. The curvature of the shim cross section in the axial plane is convex on both the axial inside and outside surfaces, preferably having the same radius of curvature, to allow angular displacement of the outer member relative to the inner member about a first pivot point inside the bearing and preferably on the bearing axis about a first radius, and relative angular displacement about a second pivot point outside the bearing about a second radius greater than the first radius.

Numerous other features, objects and advantages of the invention will become apparent from the following specification when read in connection with the accompanying drawings in which:

FIG. 1 is a perspective view of a cylindrical laminated bearing made in accordance with an embodiment of the present invention;

FIG. 2 is a sectional view taken along longitudinal section II—II of FIG. 1;

FIG. 3 is a sectional view similar to FIG. 2 except with the bearing being subject to cocking about Point A;

FIG. 4 is a sectional view similar to FIG. 2 except with the bearing being subject to cocking about Point B;

FIG. 5 is a perspective view of a shim made in accordance with an embodiment of the invention;

FIG. 6 is an enlarged sectional view taken along section VI—VI of FIG. 5 showing a cross section of the shim;

FIG. 7 is an enlarged sectional view showing the cross section of a shim made in accordance with another embodiment of the present invention.

Figure 8:
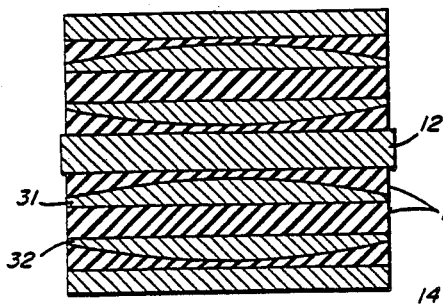
FIG. 8 is a sectional view of another embodiment of the invention showing a bearng incorporating a shim similar to that of FIG. 5 except radially split with elastomer therebetween.

Referring to the drawings, FIG. 1 shows a perspective view of a bearing 10 made in accordance with an embodiment of the invention. The bearing 10 includes an inner housing 12 of a right circular cylindrical configuration, an outer housing 14 of a hollow right circular cylindrical configuration disposed concentric to and about the inner housing 12, and an elastomeric laminate 16 disposed and bonded therebetween. The laminiate 16 comprises alternating layers 18 and 20 respectively of elastomeric and substantially non-extensible material therebetween bonded one to the other. The non-extensible layer 20 is called a shim. A single shim 20 is shown, but it should be understood that any number is within the purview of the invention. The shim 20 is of a hollow tubular configuration disposed concentrically between and spaced from the inner and outer housings 12 and 14. The design of the shim 20 is central to the invention.

Referring to FIG. 2, there is shown a sectional view along longitudinal section II—II of FIG. 1. The same reference symbols identify corresponding elements throughout the drawing. FIG. 2 shows the elements undedeflected with the ogival longitudinal cross section of shim 20 clearly observable convex on both the side facing outer housing 14 and the side facing inner housing 12, the radius of curvature of both these surfaces preferably being the same.

Referring to FIG. 3, there is shown essentially the same view as in FIG. 1, except that inner housing 12 is shown deflected clockwise relative to outer housing 14 by an angle $\theta_1$ about pivot point A at the center of the bearing 10 about a radius A corresponding substantially to the inner radius of outer housing 14.

Referring to FIG. 4, there is shown essentially the sectional view of FIGS. 2 and 3 except that inner member 12 is both axially displaced to the right relative to housing 14 and angularly displaced about pivot point B outside the housing clockwise by an incremental angle $\theta_1$ about a radius $R_B$ greater that the radius $R_A$. In an exemplary application $R_B$ is about $5R_A$.

The invention thus allows relative angular displacement between the inner and outer housings about two different pivot points, one point A inside the bearing, the other pivot point B outside the bearing. In the relative angular displacement shown in FIG. 3 the rocking of inner housing 12 relative to that of outer housing 14 is essentially along the inside curved surface of shim 20. In the relative angular displacement shown in FIG. 4, the relative angular displacement is about both the inner and outer curved surfaces of shim 20.

Referring to FIG. 5, there is shown a perspective view of shim 20.

Referring to FIG. 6, there is shown a view through section VI—VI of the shim shown in FIG. 5 showing outside convex surface 20A of radius $R_1$ and the inner convex surface 20B of radius $R_2$.

Referring to FIG. 7, there is shown another acceptable cross section for a shim 20' having end portions D and F of parallelogram cross section and the central portion E having curved inner and outside surfaces. The linear end portions D and F effectively limit the maximum relative angular deflection between inner housing 12 and outer housing 14.

Referring to FIG. 8, there is shown a longitudinal sectional view of another embodiment of the invention having two concentric shims. In this embodiment there are three elastomer layers 18 sandwiching shims 31 and 32 having flat surfaces facing each other and convex surfaces facing the adjacent ones of inner housing 12 and outer housing 14 for shims 31 and 32, respectively.

Figure 9:
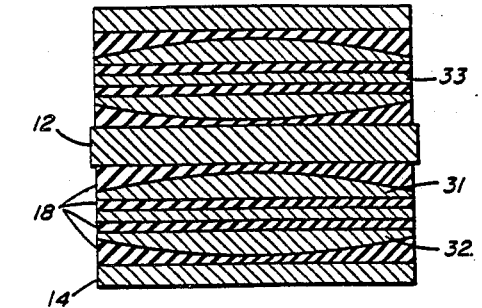
FIG. 9 is a sectional view of another embodiment of the invention showing a bearing similar to that of FIG. 8 except with an additional cylindrical shim.

Referring to FIG. 9, there is shown a longitudinal sectional view of still another embodiment of the invention including a third shim 33 having flat surfaces on both sides between shims 31 and 32 and four elastomer layers 18.

Figure 10:
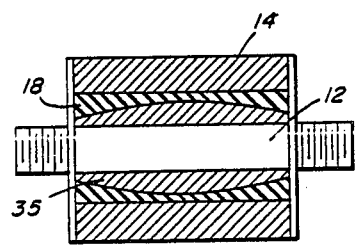
FIG. 10 is a sectional view of yet another embodiment of the invention showing a bearing with a shim disposed concentric to and adjacent the inner housing.

Referring to FIG. 10, there is shown a longitudinal sectional view of still another embodiment of the invention having a single shim 35 with a flat inside surface contiguous with inner housings 12 and a convex outer surface separated from outer housing 12 by only a single elastomer layer 18.

The present invention represents a practical solution to the problem of a bearing accommodating rotational motion about two different points comprising cocking motion taken in a compressive/tensile mode. For a conventional elastomeric bearing comprising an annular elastomer between inner and outer housings, such motion would cause delamination or greatly reduced fatigue life. With an intermediate shim member such as 20 of longitudinal cross section convex on both inside and outside surfaces, cocking compressive strains may be reduced to avoid a resulting short fatigue life while being embodied in a mechanical structure that is relatively easy and inexpensive to fabricate. Although the radii of curvature $R_1$ and $R_2$ may be unequal, they are preferably equal because cocking motion places both inboard and outboard layers of elastomer 18 in compression, and equalization of compression-induced strains results when $R1=R2$.

It is also preferred that pivot point B be on the axis midway between the ends of the bearing. Otherwise, high tensile and compressive stresses at the bearing edges might well produce catastrophic failure.

There has been described novel apparatus and techniques for providing bearing sound isolation capable of accommodating rotational motion about two different points. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A laminated bearing comprising:
inner and outer concentric housings of substantially non-extensible material, said outer housing comprising a right cylindrical inner surface, shim means of substantially non-extensible material including a portion of ogival cross-section and comprising a hollow tubular element disposed between said inner and outer housings extending along the length thereof and having a first convex surface facing at least one of said housings, and resilient material in contact with said first convex surface and the housing faced thereby.

2. A laminated bearing in accordance with claim 1 wherein said shim means is characterized by a longitudinal cross section having both inside and outside convex surfaces facing said inner housing and said outer housing respectively,
said resilient material sandwiching said shim means.

3. A laminated bearing in accordance with claim 2 wherein the radius of curvature of both said convex surfaces is substantially the same.

4. A laminated bearing in accordance with claim 3 wherein said shim means, said resilient material and said housings coact to allow cocking of said inner housing relative to said outer housing about a first pivot point inside said bearing and a second pivot point outside said bearing.

5. A laminated bearing in accordance with claim 4 wherein said first pivot point is along the axis of said bearing midway between its ends and said second point is in a plane perpendicular to the axis of said bearing and midway between its ends.

6. A laminated bearing in accordance with claim 2 wherein said shim means comprises first and second concentric elements separated by said resilient material, said first element including a first right cylindrical surface and said first convex surface, and said second element including a second right cylindrical surface and a second convex surface, said first and second cylindrical surfaces facing each other and said first and second convex surfaces facng adjacent ones of said inner and outer housings.

7. A laminated bearing in accordance with claim 6 wherein said shim means further comprises an annular element between said concentric element separated therefrom by said resilient means.

8. A laminated bearing in accordance with claim 4, wherein said shim means, said resiliant material and said housings coact such that cocking about said first pivot point is accommodated essentially along said inside convex surface while cocking about said second pivot point is accommoated about both said inner and outer convex surfaces.

9. A laminated bearing in accordance with claim 4, wherein said convex surface of said shim means includes a curved portion and linear end portions on either side of said curved portion.

10. A laminated bearing in accordancd with claim 9 further including means for limiting the maximum angular deflection of said inner housing relative to said outer housing.

11. A laminated bearing in accordance with claim 1 wherein said shim includes end portions of parallelogram cross-section and a central portion between said end portions comprising said first convex surface facing said outer housing and a second convex surface facing said inner housing.

12. A laminated bearing in accordance with claim 2 wherein said shim means contains an element.

13. A laminated bearing in accordance with claim 1 wherein said shim means contains a first element and a second element concentric with said first element.

14. A laminated bearing comprising:

inner and outer concentric housings;

shim means of substantially non-extensible material disposed between said inner and outer housings and having a first convex surface facing said outer housing and a second convex surface facing said inner housing; and elastomeric material interposed between said first convex surface and said outer housing, and between said second convex surface and said inner housing.

15. A laminated bearing in accordance with claim 14 wherein said inner and outer housings, said shim means and said elastomeric material are configured and disposed to allow first angular displacement of said outer member relative to said inner member about a pivot point inside said laminated bearing about a first radius, and second relative angular displacement thereof about a second pivot point outside said laminated bearing about a second radius greater than said first radius; said first angular displacement being substantially accommodated along said second convex surface, and said second angular displacement being accommodated along both said first and second convex surfaces.

16. A laminated bearing in accordance with claim 14 wherein said shim means contains an element.

17. A laminated bearing in accordance with claim 14 wherein said shim means comprises first and second concentric element separated by said resilient material, said first element including a first right cylindrical surface and said first convex surface, and said second element including a second right cylindrical surface and said second convex surface, said first and second cylindrical surfaces facing each other.

18. A laminated bearing in accordance with claim 14 wherein said shim means contains first and second concentric elements.

* * * * *